United States Patent
Garcia Morchon et al.

(10) Patent No.: US 9,722,787 B2
(45) Date of Patent: Aug. 1, 2017

(54) KEY SHARING DEVICE AND SYSTEM FOR CONFIGURATION THEREOF

(71) Applicant: KONINKLIJKE PHILIPS N.V., Eindhoven (NL)

(72) Inventors: Oscar Garcia Morchon, Aachen (DE); Ludovicus Marinus Gerardus Maria Tolhuizen, Waalre (NL); Jaime Gutierrez, Eindhoven (NL); Sandeep Shankaran Kumar, Waalre (NL); Domingo Gomez, Los Corrales (ES)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/397,514

(22) PCT Filed: Mar. 28, 2013

(86) PCT No.: PCT/EP2013/056730
§ 371 (c)(1),
(2) Date: Oct. 28, 2014

(87) PCT Pub. No.: WO2013/174554
PCT Pub. Date: Nov. 28, 2013

(65) Prior Publication Data
US 2016/0254909 A1    Sep. 1, 2016

Related U.S. Application Data

(60) Provisional application No. 61/658,475, filed on Jun. 12, 2012, provisional application No. 61/649,464, filed on May 21, 2012.

(30) Foreign Application Priority Data
May 21, 2012    (EP) .................................... 12168710

(51) Int. Cl.
H04L 9/00    (2006.01)
H04L 9/08    (2006.01)
(Continued)

(52) U.S. Cl.
CPC .......... *H04L 9/0866* (2013.01); *H04L 9/0838* (2013.01); *H04L 9/0869* (2013.01);
(Continued)

(58) Field of Classification Search
CPC ... H04L 63/061; H04L 9/0819; H04L 9/0838; H04L 9/0866; H04L 9/3093; H04L 2209/24
(Continued)

(56) References Cited

U.S. PATENT DOCUMENTS 7,076,061 B1 *   7/2006   Lenstra ................. H04L 9/3013
                                                          380/28
8,189,791 B2 *   5/2012   Garcia .................... H04L 9/083
                                                         380/279
(Continued)

FOREIGN PATENT DOCUMENTS

CN    101409617 A    4/2009
CN    102160406 A    8/2011
(Continued)

OTHER PUBLICATIONS

Yang et al: Pairwise Key Establishment for Large-Scale Sensor Networks: From Identifier-based to Location-Based (Invited Paper); ACM, May 2006, pp. 1-10.
(Continued)

Primary Examiner — Samson Lemma

(57) ABSTRACT

A method of configuring a network device for key sharing and a method for a first network device to determine a shared key are provided. The method of configuring uses a private modulus ($p_1$) a public modulus (N), and a bivariate poly-
(Continued)

nomial ($f_1$) having integer coefficients, the binary representation of the public modulus and the binary representation of the private modulus are the same in at least key length (b) consecutive bits. Local key material for a network device is generated by substituting an identity number into the bivariate polynomial and reducing modulo the private modulus the result of the substitution to obtain a univariate polynomial. Security may be increased by adding (440) one or more obfuscating numbers to coefficients of the univariate polynomial to obtain an obfuscated univariate polynomial. In a use phase, the network device determines a shared cryptographic key, by substituting (530) the identity number of another network device into the univariate polynomial and reducing modulo the public modulus and reducing modulo a key modulus.

14 Claims, 4 Drawing Sheets

(51) Int. Cl.
H04L 29/06 (2006.01)
H04W 12/04 (2009.01)
H04W 12/12 (2009.01)
H04L 9/30 (2006.01)

(52) U.S. Cl.
CPC .......... *H04L 9/3093* (2013.01); *H04L 63/061* (2013.01); *H04W 12/04* (2013.01); *H04W 12/12* (2013.01)

(58) Field of Classification Search
USPC ........................................................ 380/285
See application file for complete search history.

(56) References Cited

U.S. PATENT DOCUMENTS

| 8,588,411 | B2* | 11/2013 | Maas | ...................... | H04L 9/083 |
| | | | | | 380/45 |
| 9,077,520 | B2* | 7/2015 | Garcia Morchon | .... | H04L 9/085 |
| 2011/0317838 | A1 | 12/2011 | Garcia Morchon et al. | | |

FOREIGN PATENT DOCUMENTS

| WO | 9505712 A2 | 2/1995 |
| WO | 2007149850 A2 | 12/2007 |
| WO | 2010032158 A2 | 3/2010 |
| WO | 2010032161 A1 | 3/2010 |
| WO | 2010106496 A1 | 9/2010 |

OTHER PUBLICATIONS

Guo et al: "A Permutation -Based Multi Polynomial Scheme for Pairwise Key Establishment in Sensor Networks"; IEEE International Conference on Communications, May 2010, pp. 1-5.

Blundo et al: "Perfectly-Secure Key Distribution for Dynamic Conferences"; Advances in Cryptology-Crypto'92, LNCS 740, 1993, pp. 471-486.

Albrecht et al: "Attacking Cryptographic Schemes Based on Perturbation Polynomials"; CCS'09, Nov. 2009, pp. 1-10.

Zhang et al: "A Random Perturbation-Based Scheme for Pairwise Key Establishment in Sensor Networks"; MobiHoc'07, Sep. 2007, pp. 90-99.

* cited by examiner

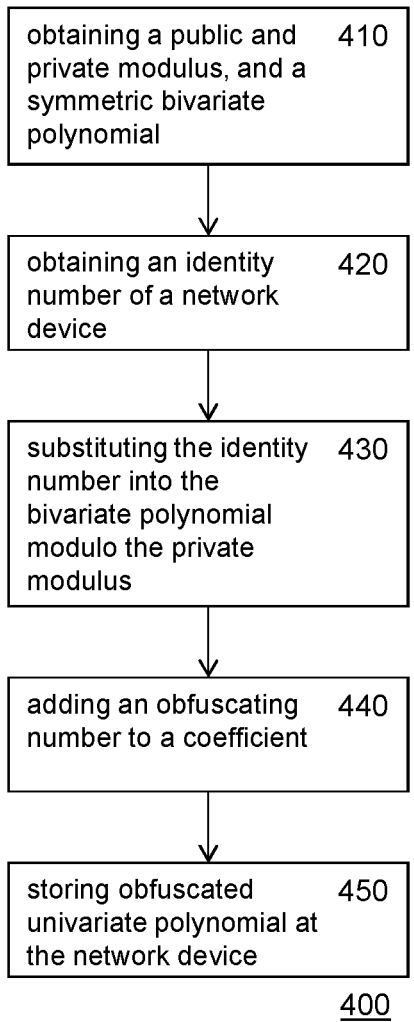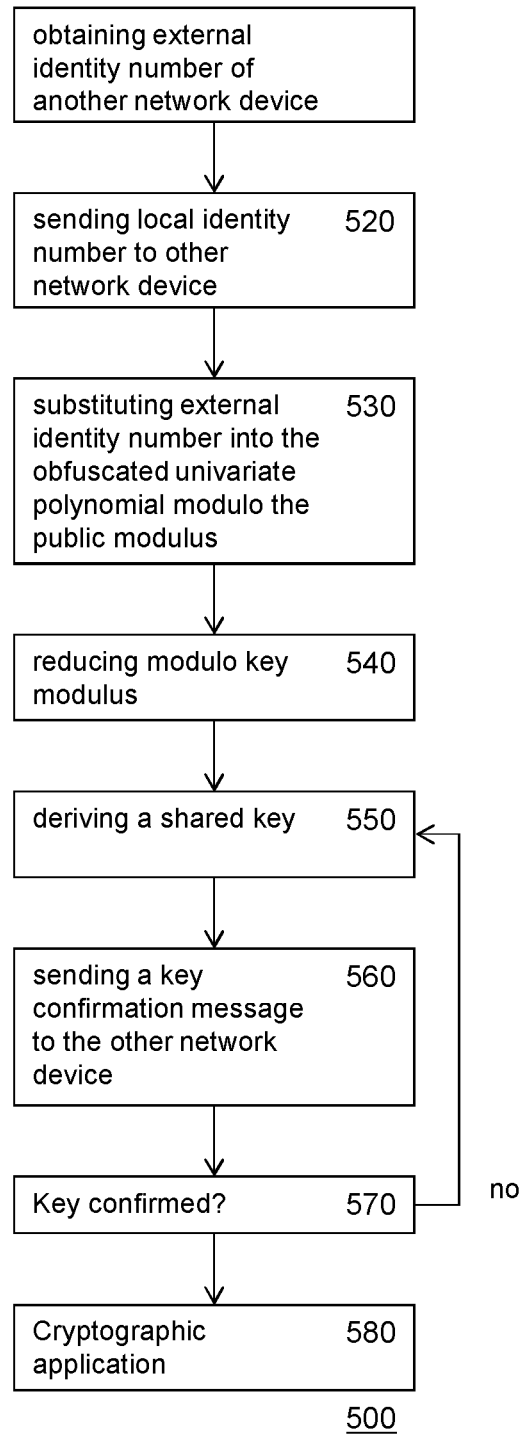
Figure 4
Figure 5

KEY SHARING DEVICE AND SYSTEM FOR CONFIGURATION THEREOF

CROSS-REFERENCE TO PRIOR APPLICATIONS

This application is the U.S. National Phase application under 35 U.S.C. §371 of International Application No. PCT/IB2013/056730, filed on Mar. 28, 2013, which claims the benefit of U.S. Provisional Patent Application No. 61/658475, filed on Jun. 12, 2012, and U.S. Provisional Patent Application No. 61/649464 filed on May 21, 2012 and European application number 12168710.7, filed on May 21, 2012. These applications are hereby incorporated by reference herein.

FIELD OF THE INVENTION

The invention relates to a method of configuring a network device for key sharing, the method comprising generating local key material for the network device comprising obtaining in electronic form an identity number for the network device, determining using a polynomial manipulation device a univariate polynomial from a bivariate polynomial by substituting the identity number into the bivariate polynomial, and electronically storing the generated local key material at the network device.

The invention further relates to a method for a first network device to determine a shared key, the key being a cryptographic key, the method comprising, obtaining local key material for the first network device in electronic form, the local key material comprising a univariate polynomial, obtaining an identity number for a second network device, the second network device being different from the first network device, substituting the identity number of the second network device into the univariate polynomial and deriving the shared key therefrom.

The invention further relates to a system for configuring a network device for key sharing, and to a network device configured to determine a shared key.

BACKGROUND OF THE INVENTION

Given a communications network comprising multiple network devices, it is a problem to set up secure connections between pairs of such network devices. One way to achieve this is described in C. Blundo, A. De Santis, A. Herzberg, S. Kutten, U. Vaccaro and M. Yung, "Perfectly-Secure Key distribution for Dynamic Conferences", Springer Lecture Notes in Mathematics, Vol. 740, pp. 471-486, 1993 (referred to as 'Blundo').

It assumes a central authority, also referred to as the network authority or as the Trusted Third Party (TTP), that generates a symmetric bivariate polynomial $f(x,y)$, with coefficients in the finite field F with p elements, wherein p is a prime number or a power of a prime number. Each device has an identity number in F and is provided with local key material by the TTP. For a device with identifier $\eta$, the local key material are the coefficients of the polynomial $f(\eta,y)$.

If a device $\eta$ wishes to communicate with device $\eta'$, it uses its key material to generate the key $K(\eta, \eta')=f(\eta, \eta')$. As f is symmetric, the same key is generated.

A problem of this key sharing scheme occurs if an attacker knows the key material of t+1 or more devices, wherein t is the degree of the bivariate polynomial. The attacker can then reconstruct the polynomial $f(x,y)$. At that moment the security of the system is completely broken. Given the identity numbers of any two devices, the attacker can reconstruct the key shared between this pair of devices.

Reference is made to the paper "A Permutation-Based Multi-Polynomial Scheme for Pairwise Key Establishment in Sensor Networks" by authors Song Guo, Victor Leung, and Zhuzhong Qian, IEEE International Conference on Communications, 2010. It presents a permutation-based multi-polynomial scheme for pairwise key establishment in wireless sensor networks. Different from Blundo, the scheme presented in Song does not give each node just one share of a symmetric polynomial, but a group of permuted shares.

SUMMARY OF THE INVENTION

It would be advantageous to have an improved method for establishing a shared key between two network devices. A method of configuring a network device for key sharing and a method for a network device to determine a shared key are provided.

The method of configuring a network device for key sharing comprises obtaining in electronic form a private modulus, a public modulus, and a bivariate polynomial having integer coefficients, the binary representation of the public modulus and the binary representation of the private modulus are the same in at least key length consecutive bits, generating local key material for the network device comprising obtaining in electronic form an identity number for the network device, determining using a polynomial manipulation device a univariate polynomial from the bivariate polynomial by substituting the identity number into the bivariate polynomial, reducing modulo the private modulus the result of the substitution, and electronically storing the generated local key material at the network device. In an embodiment, the generating local key material for the network device comprises generating an obfuscating number, e.g., by using an electronic random number generator, and adding using a polynomial manipulation device, the obfuscating number to a coefficient of the univariate polynomial to obtain an obfuscated univariate polynomial, the generated local key material comprising the obfuscated univariate polynomial. More than one coefficient may be obfuscated, preferably with different coefficients being obfuscated differently. In an embodiment, the generating local key material for the network device comprises generating multiple obfuscating numbers, e.g., by using the electronic random number generator, and adding using the polynomial manipulation device, each obfuscating number of the multiple obfuscating numbers to a respective one of the coefficients of the univariate polynomial to obtain an obfuscated univariate polynomial. In an embodiment to each coefficient of the univariate polynomial an obfuscated number is added.

The bivariate polynomial may or may not be symmetric. If the bivariate polynomial or polynomials are symmetric any two network devices may derive a shared key. Interestingly, by using an asymmetric bivariate polynomials or one or more asymmetric bivariate polynomials among multiple bivariate polynomials, as root keying material, allows to accommodate the creation of two groups of devices such as devices; Two devices belonging to the same group cannot generate a common key, but two devices in different groups can.

Adding obfuscation is an optional step. Without obfuscation protection against attacks is still obtained, because the derivation of the local key material uses a private modulus which is different from the public modulus; the mathematical relationship that would be present when working, say, in a single finite field is disturbed. This means that the usual mathematical tools for analyzing polynomials, e.g., finite algebra, no longer apply. On the other hand because the private and the public modulus overlap in a number of consecutive bits, two network devices that have local key material are likely to be able to derive the same shared key. Security may be increased by adding one or more obfuscating numbers to coefficients of the univariate polynomial to obtain an obfuscated univariate polynomial. The step of adding obfuscating numbers is however optional and may be omitted. Whether or not to add obfuscation is a tradeoff between the chance of correctly deriving a shared key, and additional security.

The public modulus is for use in the network device. The method of configuring a network device for key sharing may comprise making the public modulus available to the network device, e.g., storing the public modulus together with the local key material.

The method of determining a shared key for a first network device to, the key being a cryptographic key comprises obtaining local key material for the first network device in electronic form, the local key material comprising a, possibly obfuscated, univariate polynomial, obtaining an identity number for a second network device, the second network device being different from the first network device, substituting the identity number of the second network device into the obfuscated univariate polynomial, reducing the result of the substituting modulo the public modulus followed by reducing modulo a key modulus, and deriving the shared key from the result of the reduction modulo the key modulus. In an embodiment, e.g., the method comprises reducing the result of the substituting modulo the public modulus dividing the result by a power of two, and reducing modulo a key modulus.

Any pair of two network devices out of multiple network devices that each have an identity number and local key material generated for the identity number are able to negotiate a shared key with few resources. The two network devices need only exchange their identity numbers, which need not be kept secret, and perform polynomial computations. The type of computations needed do not require large computational resources, which means that this method is suitable for low-cost high volume type of applications.

If the local key material has been obtained from a symmetric polynomial, this allows both network devices in a pair of network devices to obtain the same shared key. If an obfuscating number has been added to the local key material, the relation between the local key material and the root key material has been disturbed. The relation that would be present between the unobfuscated univariate polynomial and the symmetric bivariate polynomial is no longer present. This means that the straightforward attack on such a scheme no longer works.

Even if no obfuscation has been used, a difficulty of attack remains because the public modulus and private modulus (or moduli) are not equal. The reduction modulo the public modulus increases the chance of deriving the same shared key, even without obfuscation.

In an embodiment, the binary representation of the public modulus and the binary representation of the private modulus are the same in at least key length (b) consecutive bits. Note, multiple private moduli may be used; they may be chosen such that the binary representation of any one of the multiple private moduli of the public modulus and the binary representation of the private modulus are the same in at least key length (b) consecutive bits. For each private modulus of the multiple private moduli a, optionally symmetric, bivariate polynomial having integer coefficients is chosen to obtain multiple, and optionally symmetric, bivariate polynomials.

Because the derivation of the local key material uses a private modulus which is different from the public modulus, the mathematical relationship that would be present when working, say, in a single finite field is disturbed. This means that the usual mathematical tools for analyzing polynomials, e.g., finite algebra, no longer apply. At best an attacker may use much less efficient structures, such as lattices. Also when deriving the shared key two modulo operations are combined which are not compatible in the usual mathematical sense; so mathematical structure is avoided at two places. The method allows direct pair wise-key generation and is resilient to the capture of a very high number, e.g. in the order of $10^5$ or even higher, of network devices. On the other hand because the private and the public modulus overlap in a number of consecutive bits, two network devices that have local key material are likely to be able to derive the same shared key.

A particular insight of the inventor was that the public modulus need not be a prime number. In an embodiment, the public modulus is composite. Also there is no reason why the public modulus should be an 'all-one' bits number, e.g., a number which only consists of 1 bits, in its binary representation. In an embodiment the public modulus is not a power of two minus 1. In an embodiment, the binary representation of the public modulus comprises at least one zero bit (not counting leading zero's, i.e., the binary representation of the public modulus comprises at least one zero bit less significant than the most significant bit of the public modulus). In an embodiment, the public modulus is a power of two minus 1 and composite.

In an embodiment the public modulus is larger than the one or more private moduli.

In an embodiment, at least key length consecutive bits of the binary representation of the public modulus minus the private modulus are all zero bits. This difference should be evaluated using the signed number representation of the public modulus minus the private modulus, not the two-complement representation. Alternatively, one may require that at least key length consecutive bits of the binary representation of the absolute value of the public modulus minus the private modulus are all zero bits. There is a set of key length (b) consecutive positions in which the binary representation of the public modulus agrees with the binary representation of all private moduli.

The consecutive bit positions in which the public modulus agrees with the private moduli, may be the least significant bits. In an embodiment, the least significant key length bits of the binary representation of the public modulus minus the private modulus are all zero bits; this has the advantage that a division by a power of two is not needed when deriving the shared key.

It is allowed in a private modulus of multiple private moduli is equal to the public modulus; However if only one private modulus is used then this is undesirable.

It is desirable that the private moduli introduce sufficient non-linearity. In an embodiment, there is a set of consecutive bit positions in which the public modulus differs with each private moduli. Furthermore, it may also be imposed that the private moduli differ among themselves; a pair wise comparison of the binary representation of the private modulus may also differ in at least one bit in a set of, say at least key length, consecutive bits, the set being equal for all private modulus, and possibly also the same for the public modulus.

The network device may be an electronic device equipped with electronic communication and computation means. The network device may be attached, e.g. in the form of an RFID tag, to any non-electronic object. For example, this method would be suitable for the 'internet of things'. For example, objects, in particular low cost objects, may be equipped with radio tags through which they may communicate, e.g. may be identified. Such objects may be inventoried through electronic means such as a computer. Stolen or broken items would be easily tracked and located. One particularly promising application is a lamp comprising a network device configured to determine a shared key. Such a lamp may securely communicate its status; such a lamp could be securely controlled, e.g., turned on and/or off. A network device may be one of multiple network devices each comprising an electronic communicator for sending and receiving an identity number and for sending an electronic status message, and each comprising an integrated circuit configured for deriving a shared key following a method according to the invention.

In an embodiment, the method in the invention can be used as a cryptographic method for security protocols such us IPSec, (D)TLS, HIP, or ZigBee. In particular, a device using one of those protocols is associated to an identifier. A second device willing to communicate with the first device can generate a common pair wise key with the first device given its identifier, and the pair wise key (or a key derived from this by means of, e.g., a key derivation function) can be used in a method of the above protocols based on pre-shared key. In particular, the identifier of a device as defined in this invention can be a network address such as the ZigBee short address, an IP address, or the host identifier. The identifier can also be the IEEE address of a device or a proprietary bit string associated to the device so that a device receives some local keying material associated to the IEEE address during manufacturing.

Deriving a shared key may be used for many applications. Typically, the shared key will be a cryptographic symmetric key. The symmetric key may be used for confidentiality, e.g., outgoing or incoming messages may be encrypted with the symmetric key. Only a device with access to both identity numbers and one of the two local key materials (or access to the root key material) will be able to decrypt the communications. The symmetric key may be used for authentication, e.g., outgoing or incoming messages may be authenticated with the symmetric key. In this way the origin of the message may be validated. Only a device with access to both identity numbers and one of the two local key materials (or access to the root key material) will be able to create authenticated messages.

The method of configuring a network device for key sharing will typically be executed by a network authority, e.g., a trusted third party. The network authority may obtain the needed material, e.g., root key material from another source, but may also generate this himself. For example, the public modulus may be generated. For example, the private modulus may be generated, even if the public modulus is a system parameter and received.

In an embodiment, the public modulus N is chosen such that it satisfies $2^{(a+2)b-1} \leq N \leq 2^{(a+2)b}-1$, wherein, a represents the degree of the bivariate polynomial and b represents the key length. For example, in an embodiment $N=2^{(a+2)b}-1$. The modulo operation for the latter choice may be implemented particularly efficiently.

Having a fixed public modulus has the advantage that it need not be communicated to the network devices, but may be integrated with e.g. their system software. In particular, the public modulus may be chosen using a random number generator.

The public and private modulus may be represented as a bit string. They may also be abbreviated using each particular mathematical structure. For example, instead of storing a private modulus, one may also store its difference with the public modulus, which is much shorter.

Having a private modulus chosen in such a way that a 'key length' number of the least significant bits of the binary representation of the public modulus minus the private modulus are all zero bits increases the likelihood that a shared key at a first network device of a pair of network device is close to the shared key derived at a second network device of the pair of network device; that is the binary representation of the private modulus has the same bits in the 'key length' least significant positions as the binary representation of the public modulus. For example, if the key length is 64, a private modulus may be chosen by subtracting a multiple of 2^64 from the public modulus. In an embodiment, the public modulus minus a private modulus divided by two to the power of the key length is less than two to the power of the key length.

In an embodiment multiple private moduli are obtained or generated in electronic form, for each private modulus of the multiple private moduli a symmetric bivariate polynomial having integer coefficients is chosen to obtain multiple symmetric bivariate polynomials, so that to each private modulus a symmetric bivariate polynomial corresponds. Determining the univariate polynomial comprises substituting the identity number into each one of the multiple symmetric bivariate polynomials, reducing modulo a private modulus of the multiple private moduli corresponding to the one symmetric bivariate polynomial, and adding the multiple results of the multiple reductions together. Having multiple symmetric bivariate polynomials for different moduli increases the security because incompatible structures are further mixed. Typically the private moduli are distinct. Having multiple private moduli further complicates analysis even more if the corresponding algebraic structures are very different; for example, choosing them relatively prime, in particular pair-wise relatively prime, even more in particular by choosing them as distinct primes.

Having a different private modulus, and in particular multiple private moduli, will complicate analysis. To further increase security additional controls on the coefficients are possible. In an embodiment, the authority adding the multiple resulting univariate polynomials of the multiple reductions together verifies whether the value of each of the resulting coefficients is either too small or too big, e.g. less than a minimum threshold or above a maximum threshold This improves security even further because in either of the two cases, an attacker might find out the components of the multiple reductions if they are too big or too small. For instance, if the value of a coefficient resulting after the addition is equal to 1 and there are only two univariate polynomials, then an attacker knows that either the corresponding coefficient associated to the first polynomial is 1 and the one associated to the second polynomial is 0, or the other way around. In particular, the authority generating the local key material for a device can verify whether the value of each of the resulting coefficients of the local keying material is at least 'minimum value' and at most 'maximum value'. This checking may omitted, in particular, if the public modulus is relatively close to all private moduli and all elements of the key material are between 0 and N−1. If the TTP is capable of assigning identity numbers it could also assign another identity number to the device, if the TTP detects small or big coefficients.

In an embodiment, each specific private modulus is such that the least significant key length (b) bits of the binary representation of the public modulus minus the specific private modulus are all zero bits.

The public modulus may both be larger or smaller than the private modulus. In an embodiment the binary representation of the public modulus minus the private modulus has at least key length bits all zero. The zero bits at least key length zero bits are consecutive and may be present at any point in the binary representation. Having a string of zero bits in the difference between the public modulus and the private modulus avoids that obfuscation carries too far. In an embodiment, there is an integer parameter 's', such that key length least significant bits of the public modulus minus the private modulus, divided by two to the power s are all zero. The parameter 's' is the same for all private moduli.

For example, one may define a zero bit string divisor which is a power of two, such that each specific private modulus being such that key length (b) bits of the binary representation of the public modulus minus the specific private modulus divided by the zero bit string divisor are all zero bits. If the least significant bits are zero, the zero bit string divisor may be taken to be 1. In an embodiment the zero bit string divisor is larger than 1. The division by a power of two is to be interpreted as an integer division, giving the same result as a shift of the bits in the direction of the least significant bits. Any remainder of the division is ignored.

To generate the shared key of key length bit, the network devices first apply an additional division step. The first network device evaluates the keying material for the identity number of the second device modulo the public modules, dividing by 2^s and reducing modulo two to the power of the key length. Note that this is equivalent to applying first a module 2^(s+key length) after the public modulo, and then dividing by 2^s. Here "dividing" includes rounding downwards.

In an embodiment, the private modulus is generated using a random number generator. In an embodiment, the multiple private moduli are generated such that they are pair wise relatively prime. For example, the multiple private moduli may be generated iteratively verifying for each new private modulus that they are still pair wise relatively prime, and if not discarding the last generated private modulus. An embodiment comprises iteratively generating a candidate modulus, using the random number generator, such that key length (b) consecutive bits of the binary representation of the public modulus minus the candidate modulus are all zero bits, e.g., the least significant key length bits, until the candidate modulus satisfies a primality test using a primality testing device, wherein the so obtained candidate modulus satisfying the primality test is used as the private modulus. The primality test may, e.g., be the Miller-Rabin primality test or the Solovay-Strassen primality test.

A symmetric bivariate polynomial in variables of x and y of degree a, has only monomials of the form $x^i y^j$, with $i \leq a, j \leq a$. Furthermore the coefficient corresponding to $x^i y^j$ is the same as the coefficient of $x^j y^i$. This may be used to reduce the number of stored coefficients by about half. Note that a more relaxed definition of the degree is used. We define the degree of a monomial, as the maximum degree of the variables in the monomial. So the degree of $x^j y^i$ is max(i,j), i.e., that $i \leq a, j \leq a$. So for example what we call a polynomial of degree 1 has as general form a+bx+cy+dxy, (note that since only symmetric polynomials are considered, we have that b=c). Note that if desired one may put additional restrictions on the bivariate polynomial, including, e.g., that only monomials with i+j≤a are used, but this is not needed.

In an embodiment the symmetric bivariate polynomial is generated by the network authority. For example, the symmetric bivariate polynomial may be a random symmetric bivariate polynomial. For example, the coefficients may be selected as random numbers using a random number generator.

Although the obfuscation used greatly increases the resilience against attack, in particular against collusion attacks wherein multiple local key materials are combined, it has a potential drawback. Sometimes the shared key derived by the first network device is not in all bits identical to the shared key derived by the second network device. This is mainly due to the mismatch in the bits of carry after the addition of the obfuscating coefficients. Another reason is the lacking effect of the modular effects of each of the private moduli during the generation of the key that affects the generated bits of carry. Although a nuisance this drawback may be resolved in various manners. By choosing the obfuscation with more care the likelihood of a difference and in particular the likelihood of a large difference can significantly be reduced. Furthermore, it was found that differences, if they are any, are likely to be located in the least significant bits of the generated keys. So by removing one or more of the least significant bits the likelihood of an identical shared key may be increased. For example, in an embodiment of the method of determining a shared key comprises determining if the first network device and the second network device have derived the same shared key, and if not deriving a further shared key from the result of the reduction modulo the key modulus. Further shared keys may be derived until one is found that is equal on both sides. If less than a threshold number of bits remain in the shared key, the method may be terminated. For some applications it may simply be accepted that some percentage of the network devices are not able to communicate. For example, in ad-hoc wireless networks wherein a message may be routed along various routes, there is no loss of connectivity if some of the network devices are not able to communicate.

Note that without obfuscation it may also happen that the shared key derived by the first network device is not in all bits identical to the shared key derived by the second network device, although the chance of this is less than the case with obfuscation.

In an embodiment, a number of the least significant bits of the shared key are removed; for example, the number of removed bits may be 1, 2 or more, 4 or more, 8 or more, 16 or more, 32 or more, 64 or more. By removing more of the least significant bits, the chance of having keys that are not equal is reduced; in particular it may be reduced to any desired threshold. The chance of shared keys being equal may be computed, by following the mathematical relationships, it may also be determined by experiment.

Also the choice of obfuscating numbers may be controlled, in an embodiment, the range from which an obfuscating number is chosen is reduced for coefficients corresponding to higher degree monomials. In particular, one may require that $|\epsilon_{A,i}| < 2^{(a+1-i)b}$, wherein $\epsilon_{A,i}$ denotes the obfuscating number for the i-th monomial, i denotes the degree of the monomial corresponding to the coefficient, a represents the degree of the bivariate polynomial and b represents the key length. A represents the network device for which the local key material is generated. In an embodiment, an obfuscating number is generated for each coefficient, e.g., using the above formula. Different obfuscation may be applied for different network devices. For example, even if there are 3 or more network devices, than for each network device different obfuscation numbers may be generated.

Note that the obfuscating number may be restricted to positive numbers but this is not needed, the obfuscating numbers may be negative. In an embodiment, the obfuscated numbers are generated using a random number generator. Multiple obfuscating numbers may be generated and added coefficients of the univariate polynomial to obtain the obfuscated univariate polynomial. One or more, preferably even all, coefficients of the univariate polynomial may be obfuscated in this manner.

The number of bits in the identity number for the network device is usually chosen than less or equal than the key length. The identity number may be a bit string, say a 32 or 64, or longer, bits string. The key length may be 32 or more, 48 or more, 64 or more, 96 or more, 128 or more, 256 or more. The key length may be chosen some number of bits higher in order to reduce a corresponding number of least significant bits of the determined shared key. On the other hand, in an embodiment, the length of the identity number is longer than the key length. In this case, the effect of modular operations can lead to a higher effect on the least significant bits of the key length-bits of the generated key so that those bits might not be equal for a pair of devices willing to generate a common key. Having a longer length for the identifier can have, however, a positive effect in the security since more bits are mixed together when doing the corresponding computations.

A polynomial manipulation device may be implemented in software running on a computer, say on an integrated circuit. A polynomial manipulation device may be very efficiently implemented in hardware. A combination is also possible. For example, a polynomial manipulation device may be implemented by manipulating arrays of coefficients representing the polynomials.

Electronically storing the generated local key material at the network device may be implemented by electronically sending the generated local key material to the network device, e.g., using a wired connection, or using a wireless connection and having the generated local key material stored at the network device. This may be done during manufacturing or installation, e.g., during testing, of an integrated circuit in the network device. The test equipment may comprise or be connected the network authority. This may also happen after a successful joining of a device to an operation network (i.e., after network access or bootstrapping). In particular, the local key material can be distributed as a part of operational network parameters.

Obtaining local key material for the first network device in electronic form may be done by electronically receiving the local key material from a system for configuring a network device for key sharing, e.g., a network authority device. Obtaining local key material may also be done by retrieving the local key material from a local storage, e.g., a memory such as flash memory.

Obtaining an identity number for a second network device, may be done by receiving the identity number from the second network device, e.g., directly from second network device, e.g., wirelessly receiving from the second network device.

The public modulus and the key modulus may be stored in a network device. They may also be received from a network authority. They may also be implicit in software of the network device. For example, in an embodiment the key modulus is a power of two. Reduction modulo such a key modulus may be done by discarding all bits except the key length least significant bits. First the result of the substituting is reduced modulo the public modulus which is then further reduced modulo the key modulus.

Although not required, the public modulus and key modulus may be relatively prime. This may be achieved by having the public modulus odd and the key modulus a power of 2. In any case, it is avoided that the key modulus divides the public modulus, as then reduction modulo the public modulus could be omitted.

The method for key agreement between two devices may use as root keying material a number of bivariate polynomials. One may use the method for key agreement using for x-agreement between x parties by using x-variate polynomials as root keying material. In this extension, the trusted third party evaluates the x-variate polynomials in a variable in the corresponding ring, the resulting x−1 variate polynomials are then added over the integers generating the local key material stored on a device. When x devices need to agree on a key, a device evaluates its local key material in identifiers of the other x−1 devices. For example, one may use multivariate polynomials in a method of configuring a network device for key sharing, the method comprising obtaining in electronic form a private modulus ($p_1$), a public modulus (N), and a multivariate polynomial ($f_1$) having integer coefficients, the binary representation of the public modulus and the binary representation of the private modulus are the same in at least key length (b) consecutive bits, generating local key material for the network device comprising obtaining in electronic form an identity number (A) for the network device, determining using a polynomial manipulation device a polynomial from the multivariate polynomial by substituting the identity number into the multivariate polynomial, reducing modulo the private modulus the result of the substitution, and electronically storing the generated local key material at the network device. The polynomial obtained by the polynomial manipulation device is over one fewer variable. It is convenient for key sharing if the multivariate is symmetric in all variables. A corresponding method for a first network device to determine a shared key, the key being a cryptographic key, the method comprising, obtaining local key material for the first network device in electronic form, the local key material comprising a, optionally obfuscated, polynomial, obtaining an identity number for a multiple other network devices, the second network device being different from the first network device, substituting the identity number of the other network devices into the, optionally obfuscated, polynomial, reducing the result of the substituting modulo the public modulus and reducing modulo a key modulus, and deriving the shared key from the result of the reduction modulo the key modulus. Note that after substituting all but one of the other identity numbers the method reduces to situation in which a univariate polynomial is used.

In an embodiment, a first network device receives multiple (n) local key materials associated to the device's identifier. The key generated between this first device and a second device is obtained as the combination (e.g., concatenation) of the multiple (n) keys obtained by evaluating each of the multiple (n) local key materials of the first device in the identifier of the second device. This allows use of the method in parallel.

The use of asymmetric bivariate polynomials as root keying material, i.e., $f(x,y) != f(y,x)$, allows to accommodate the creation of two groups of devices such as devices in the first group receive KM(Id,y) and devices in the second group receive KM(x,iD) being KM the local key material stored on a device. Two devices belonging to the same group cannot generate a common key, but two devices in different groups can. See further Blundo.

The identity number of a network device may be computed as the one-way function of a bit string containing information associated to the device. The one-way function can be a cryptographic hash function such as SHA2 or SHA3. The output of the one-way function can be truncated so that it fits the identifier size. Alternatively the size of the one-way function is smaller than the maximum identifier size.

In an embodiment, the symmetric polynomials involve a single monomial of the form $<ax^iy^i>_{pj}$ where $<>_p$ represents the module operation. In this case, the elements are within a finite group and the operation is the multiplication. The public modulus may be larger than the private modulus or smaller; if there are multiple private moduli, some maybe larger than the private modulus and some may be smaller.

In an embodiment of the method of configuring a network device for key sharing, the method comprises obtaining in electronic form multiple private moduli ($p_i$), and multiple symmetric bivariate polynomials ($f_i$) having integer coefficients, such that there is a set of key length (b) consecutive positions in which the binary representation of the public modulus is the same as the binary representation of all private moduli, generating local key material for the network device comprising obtaining in electronic form an identity number (A) for the network device, determining using a polynomial manipulation device a univariate polynomial from the multiple bivariate polynomials by substituting the identity number into each one of the multiple bivariate polynomials, reducing modulo a private modulus of the multiple private moduli corresponding to the one symmetric bivariate polynomial, and adding the multiple results of the multiple reductions, and generating an obfuscating number and adding using a polynomial manipulation device, the obfuscating number to a coefficient of the univariate polynomial to obtain an obfuscated univariate polynomial, the generated local key material comprising the obfuscated univariate polynomial, and electronically storing the generated local key material at the network device. A bivariate polynomials of the multiple bivariate polynomials ($f_i$) may be represented as having coefficients modulo the corresponding private modulus ($p_i$).

More generally, the root key material, may be evaluated over any ring. It is possible to use polynomials of a single monomial such as $Ax^a$, in which case a group may be used.

An aspect of the invention concerns a system for configuring a network device for key sharing, e.g., a network authority, the system comprising a key material obtainer for obtaining in electronic form a private modulus, a public modulus, which may or may not be larger than the private modulus, and a symmetric bivariate polynomial having integer coefficients, key length bits of the binary representation of the public modulus minus the private modulus are all zero bits, possibly the key length least significant bits, a generator for generating local key material for the network device comprising a network device manager for obtaining in electronic form an identity number for the network device and for electronically storing the generated local key material at the network device, and a polynomial manipulation device for determining a univariate polynomial from the bivariate polynomial by substituting the identity number into the bivariate polynomial, reducing modulo the private modulus the result of the substitution.

An embodiment of the system comprises an obfuscating number generator, e.g., a random number generator, for generating an obfuscating number, the polynomial manipulation device is configured for adding the obfuscating number to a coefficient of the univariate polynomial to obtain an obfuscated univariate polynomial, the generated local key material comprising the obfuscated univariate polynomial.

An aspect of the invention concerns a first network device configured to determine a shared key, the key being a cryptographic key, the first network device comprising, a local key material obtainer for obtaining local key material for the first network device in electronic form, the local key material comprising an obfuscated univariate polynomial, a receiver for obtaining an identity number for a second network device, the second network device being different from the first network device, a polynomial manipulation device for substituting the identity number of the second network device into the obfuscated univariate polynomial and reducing the result of the substituting modulo the public modulus followed by reducing modulo a key modulus, the public and key modulus being relatively prime, a key derivation device for deriving the shared key from the result of the reduction modulo the key modulus.

A key derivation device may be implemented as a computer, e.g., an integrated circuit, running software, in hardware, in a combination of the two, and the like, configured for deriving the shared key from the result of the reduction modulo the key modulus.

Deriving the shared key from the result of the reduction modulo the key modulus, may include the application of a key derivation function, for example the function KDF, defined in the OMA DRM Specification of the Open Mobile Alliance (OMA-TS-DRM-DRM-V2_0_2-20080723-A, section 7.1.2 KDF) and similar functions. Deriving the shared key may include discarding one or more least significant bits (before applying the key derivation function). Deriving the shared key may include adding, subtracting, or concatenating an integer (before applying the key derivation function).

Multiple network devices each having an identity number and corresponding local key material may together form a communication network configured for secure, e.g., confidential and/or authenticated, communication between pairs of network devices.

The key generation is ID-based and allows the generation of pair wise keys between pairs of devices. A first device A may rely on an algorithm that derives a key from local key material and an identity number.

In an embodiment, a first network device sends a key confirmation message to the second network device. For example, a confirmation message may comprise the encryption of a message, and optionally the message itself. The second network device can verify the encryption of the message. The message may be fixed and present at the second device, to avoid the need of sending it. The message may be random, or a nonce, etc, in which case it may be sent together with the encryption. The second device may reply with a message with contains an indication if the keys agree. The second device may also reply with a key confirmation message of its own. It the first and/or second device finds out that the keys are not equal they may start a key equalization process, e.g., by deleting least significant bits, etc.

The network devices and the system may be electronic devices. The network devices may be mobile network devices.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer In a preferred embodiment, the computer program comprises computer program code means adapted to perform all the steps of a method according to the invention when the computer program is run on a computer. Preferably, the computer program is embodied on a computer readable medium.

For completeness the international application WO2010032161 with title "A method for secure communication in a network, a communication device, a network and a computer program therefor", is mentioned, which relates to a method for secure communications in a communication networks.

There are number of differences with that application, including: the use of modular operations, in particular combining modular operations with a different public and private modulus, repeated modular operations, e.g. a reduction modulo a public modulus followed by a reduction modulo a key modulus, the use of obfuscation, the use of whole polynomials.

A method of configuring a network device for key sharing and a method for a first network device to determine a shared key are provided. The method of configuring uses a private modulus ($p_1$), a public modulus (N), and a bivariate polynomial ($f_1$) having integer coefficients, the binary representation of the public modulus and the binary representation of the private modulus are the same in at least key length (b) consecutive bits. Local key material for a network device is generated by substituting an identity number into the bivariate polynomial and reducing modulo the private modulus the result of the substitution to obtain a univariate polynomial. Security may be increased by adding (440) one or more obfuscating numbers to coefficients of the univariate polynomial to obtain an obfuscated univariate polynomial. In a use phase, the network device determines a shared cryptographic key, by substituting (530) the identity number of another network device into the univariate polynomial and reducing modulo the public modulus and reducing modulo a key modulus.

BRIEF DESCRIPTION OF THE DRAWINGS

These and other aspects of the invention are apparent from and will be elucidated with reference to the embodiments described hereinafter. In the drawings, FIG. 4 is a schematic flow chart illustrating generating local key material, FIG. 5 is a schematic flow chart illustrating generating a shared key.

Figure 1:
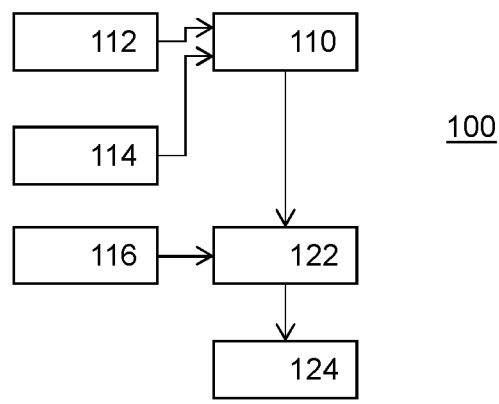
FIG. 1 is a schematic block diagram illustrating a root key material generator.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE NUMERALS

100 a root key material obtainer
110 a public modulus element
112 a polynomial degree element
114 a key length element
116 a number of polynomials element
122 a private modulus manager
124 a symmetric bivariate polynomial manager
200 a local key material generator
210 a public material element
220 a private material element
240 a polynomial manipulation device
250 a network device manager
260 an obfuscating number generator
300 a communication network
310 a first network device
320 a second network device
330 a transceiver
342 a polynomial manipulation device
344 a local key material obtainer
346 a key derivation device
348 a key equalizer
350 a cryptographic element

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

Below an embodiment of the key sharing method is described. The method has a set-up phase and a use phase. The set-up phase may include initiation steps and registration steps. The initiation steps do not involve the network devices.

The initiation steps select system parameters. The initiation steps may be performed by the trusted third party (TTP). However, the system parameters may however also be regarded as given as inputs. In that case the trusted third party need not generate them, and the initiation steps may be skipped. For example, the trusted third party may receive the system parameters from a device manufacturer. The device manufacturer may have performed the initiation steps to obtain the system parameters. For convenience of exposition we will refer to the trusted third party as performing the initiation steps, bearing in mind that this is not necessary.

Initiation Steps

The desired key length for the key that will be shared between devices in the use phase is selected; this key length is referred to as 'b'. A typical value for a low security application may be 64 or 80. A typical value for a consumer level security may be 128. Highly secret applications may prefer 256 or even higher values.

The desired degree is selected; the degree controls the degree of certain polynomials. The degree will be referred to as 'a', it is at least 1. A practical choice for a is 2. A more secure application may use a higher value of a, say 3 or 4, or even higher. For a simple application also a=1 is possible.

The case a=1 is related to the so called 'hidden number problem'; higher "a" values are related to the extended hidden number problem confirming that these cases are hard to break.

The number of polynomials is selected. The number of polynomials will be referred to as 'm'. A practical choice for m is 2. A more secure application may use a higher value of m, say 3 or 4, or even higher. Note that a low-complexity application, say for resource bounded devices may use m=1.

Higher values of security parameters a and m increase the complexity of the system and accordingly increase its intractability. More complicated systems are harder to analyze and thus more resistant to cryptanalysis.

In an embodiment, a public modulus N is selected satisfying $2^{(a+2)b-1} \le N$ and most preferably also $N \le 2^{(a+2)b}-1$. The bounds are not strictly necessary; the system could also use a smaller/larger value of N, although that is not considered the best option.

Often the key length, degree and number of polynomials will be pre-determined, e.g., by a system designer, and provided to the trusted party as inputs. As a practical choice one may take $N=2^{(a+2)b}-1$. For example if a=1, b=64 then N may be $N=2^{192}-1$. For example if a=2, b=128 then N may be $N=2^{512}-1$. Choosing for N the upper or lower bound of the above interval has the advantage of easy computation. To increase complexity one may choose a random number within the range for N.

A number of m private moduli $p_1, p_2, \ldots, p_m$, are selected. Moduli are positive integers. During the registration steps each device will be associated with an identity number. Each selected private modulus is larger than the largest identity number used. For example, one may bound identity numbers by requiring that they are less or equal to $2^b-1$, and that the selected private moduli are larger than $2^b-1$. Each selected number satisfies the following relationship $p_j = N + \gamma_j \cdot 2^b$. Wherein the $\gamma_j$ are integers such that $|\gamma_j| < 2^b$. One practical way of selecting numbers that satisfy this requirement is to choose a set of m random integers $\gamma_j$ such that $-2^b+1 \le \gamma_j \le 2^b-1$ and compute the selected private moduli from the relationship $p_j = N + \gamma_j \cdot 2^b$. Having $|\gamma_j|$ a bit larger may be allowed, however, a problem may occur in that the modular operation goes too far so that shared keys might not be equal.

For m>1, the system is more complicated, and thus more secure, since modulo operation for different moduli are combined even though such operations are not compatible in the usual mathematical sense. For this reason it is advantageous to choose the selected private moduli as pair wise distinct.

A number of m symmetric bivariate polynomials $f_1, f_2, \ldots, f_m$ of degrees $a_j$ are generated. All degrees satisfy $a_j \le a$, most preferably $a = MAX\{a_1, \ldots, a_m\}$. A practical choice is to take each polynomial of degree a. A bivariate polynomial is a polynomial in two variables. A symmetric polynomial f satisfies f(x,y)=f(y,x). Each polynomial $f_j$ is evaluated in the finite ring formed by the integers modulo $p_j$, obtained by computing modulo $p_j$. The integers modulo $p_j$ form a finite ring with $p_j$ elements. In an embodiment the polynomial $f_j$ is represented with coefficients from 0 up to $p_j-1$. The bivariate polynomials may be selected at random, e.g., by selecting random coefficients within these bounds. Note that some or all of the bivariate polynomials may be generated asymmetrically, which leads to a system with two groups. We will assume for simplicity that the all selected polynomials are symmetric.

The security of the key sharing depends on these bivariate polynomials as they are the root keying material of the system; so preferably strong measures are taken to protect them, e.g., control procedures, tamper-resistant devices, and the like. Preferably the selected integers $p_1, p_2, \ldots, p_m$ are also kept secret, including the value $\gamma_j$ corresponding to $p_j$, though this is less critical. We will refer to the bivariate polynomials also in the following form: for j=1, 2, ..., m, we write $f_j(x,y) = \sum_{i=0}^{a} f_{i,j}(x) y^i$.

The above embodiment can be varied in a number of ways. The restrictions on the public and private moduli may be chosen in a variety of ways, such that obfuscation of the univariate polynomial is possible, yet that the shared keys obtained at network devices remain sufficiently close to each other sufficiently often. As explained, what is sufficient will depend on the application, the required security level and the computing resources available at the network devices. The above embodiment combines positive integers such that the modular operations which are carried out when generating the polynomials shares are combined in a non-linear manner when they are added over the integers creating a non-linear structure for the local key material stored on a network device. The above choice for N and $p_j$ has the property that: (i) the size of N is fixed for all network devices and linked to a; (ii) the non-linear effect appears on the most significant bits of the coefficients forming the key material stored on the device. Because of that specific form the shared key may be generated by reducing module $2^b$ after the reduction modulo N.

These design concepts can be applied in a more general way to improve on aspects (i) and (ii) as mentioned in the last paragraph. Below different, general constructions, are given to choose the public and private moduli. To address the first point (i), this structure for N and $p_j$ fits a more general expression where we write $p_j = 2^X + \gamma_j 2^{Y_j} - 1$ such that for each j, $Y_j + b\alpha_j = X$ and $|\gamma_j| < 2^b$. This expression allows for a more variable form $p_j$ while ensuring a maximum effect when introducing non-linear effects. Note that one can also make, $Y_j + b\alpha_j \approx X$ where the difference between the left and right-hand side is a fraction of the key length.

To address the second point, the above form for N and $p_j$ fits an even more general expression in which $p_j = \beta 2^X + \gamma_j 2^{Y_j} + \zeta_j 2^{Z_j}$. By setting, e.g., $\zeta_j = -1, \beta = 1$, and $Z_j = 0$ $\forall j$ we obtain the previous expression in which the different $\gamma_j$ values introduce a non-linear effect in the most significant bits of the coefficients of the key material stored on a network device. In this case, the constant public modulus (N) is $N = 2^X - 1$, while the private variable part used in the generation of different positive integers involved in the modular operations is $\gamma_j 2^{Y_j}$. Alternatively, we can set $\gamma_j = 1, \beta = 1, Z_j = 0$, $Y_j = (\alpha_j+1)b, X = (\alpha_j+2)b$ $\forall j$ while $\zeta_j$ are different for different j such that $|\zeta_j| < 2^b$. In this case, the differences in $\zeta_j$ allow introducing a non-linear effect in the least significant bits of the coefficients of the local key material stored on a node. The construction of the public part in this case is also different and equal to $N = \beta_j 2^{X_j} + \gamma_j 2^{Y_j} = 2^X + 2^{b(\alpha_j+1)}$ i.e., the parts that remain constant. Note in this case the non-linear effect is in the lowest part, and because of the condition for maximum mixing effect mentioned before, then the difference between $Y_j - Z_j - \log_2(\zeta_j)$ must be $\alpha_j b$. In a similar way, other constructions can be defined following the same concept.

Registration Steps

In the registration step each network device is assigned keying material (KM). A network device is associated with an identity number. The identity number may be assigned on demand, e.g. by the TTP, or may already be stored in the device, e.g., stored in the device at manufacture, etc.

The TTP generates a set of keying material for a device A as follows:

$$KM^A(X) = \Sigma_{j=1}^m < f_j(x,A)>_{p_j} + 2^b \Sigma_{i=0}^a \epsilon_{A,i} X^i = \Sigma_i C_i^A x^i$$

Wherein $KM^A(X)$ is the keying material of a device with identity number A; X is a formal variable. Note that the keying material is non-linear. The notation $<\ldots>_{p_j}$ denotes reducing modulo $p_j$ each coefficient of the polynomial between the brackets. The notation '$\epsilon_{A,i}$' denotes a random integer, which is an example of an obfuscating number, such that $|\epsilon_{A,i}| < 2^{(a+1-i)b}$. Note that any one of the random integers may be positive or negative. The random numbers $\epsilon$ are generated again for each device. The term $\Sigma_{i=0}^a \epsilon_{A,i} X^i$ thus represents a polynomial in X of degree a, of which the coefficient length is shorter with increasing degree. Alternatively, a more general, but more complicated condition is that $\Sigma_{i=0}^a |\epsilon_{A,i}| \cdot 2^{b+i}$ is small, e.g., <2a. Note that the step of adding obfuscation is optional and may be omitted, but is preferred to obtain a higher security level. We will assume that obfuscation is used.

All other additions may either use the natural integer arithmetic, or (preferably) they use addition modulo N. So the evaluation of the univariate polynomials $\Sigma_{j=1}^m < f_j(x,A)>_{p_j}$ is each individually done modulo a smaller modulus $p_j$ but the summation of these reduced univariate polynomials themselves is preferably done modulo N. Also adding the obfuscating polynomial $2^b \Sigma_{i=0}^a \epsilon_{A,i} X^i$ may be done using natural integer arithmetic or, preferably, modulo N. The keying material comprises the coefficients $C_i^A$ with i=0, . . . , a. The keying material may be presented as a polynomial as above. In practice, the keying material may be stored as a list, e.g., an array, of the integers $C_i^A$. The device A also receives the numbers N and b. Manipulation of polynomials may be implemented, e.g., as manipulation of arrays containing the coefficients, e.g., listing all coefficient in a predetermined order. Note that polynomials may be implemented, in other data structures, e.g., as an associative array (aka a 'map') comprising a collection of (degree, coefficient) pairs, preferably such that each coefficient appears at most once in the collection. The coefficients $C_i^A$ that are provided to the device are preferably in the range 0, 1, . . . N−1.

In case, that the more general construction for N and the integer numbers $p_j$ is used, the obfuscating polynomial needs to be adapted so that the random numbers E affect different parts of the coefficients. For instance, if the non-linear effect is introduced in the least significant bits of the coefficients of the key material stored on the network devices, then the random numbers should only affect the highest part of the coefficients and a variable number of bits in the lowest part of the coefficients. This is a direct extension of the method described above and other extensions are feasible.

Use Phase

Once two devices A and B have an identity number and received their keying material from the TTP, they may use their keying material to obtain a shared key. Device A may perform the following steps to obtain his shared key. First, device A obtains the identity number B of device B, then A generates the shared key by computing the following:

$$K_{AB} = << KM^A(x)|_{x=B}>_N>_{2^b} = <<\Sigma_i C_i^A B^i>_N>_{2^b}$$

That is, A evaluates his keying material, seen as an integer polynomial, for the value B; the result of evaluating the keying material is an integer. Next device A reduces the result of the evaluation first modulo the public modulus N and then modulo the key modulus $2^b$. The result will be referred to as A's shared key, it is an integer in the range of 0 up to $2^b-1$. For its part, device B can generate B' shared key by evaluating its keyed material for identity A and reducing the result modulo N and then modulo $2^b$.

In line with the above description, if a more general expression of N and the positive integers $p_j$ is used, then the method to obtain the b-bits key needs a small adaptation. In particular, if the non-linear effect is introduced in the lowest bits of the coefficients of the key material stored on the network devices while the second term in the expression of N is $Y_j$, then the key is generated as follows:

$$K_{AB} = < \frac{< KM^A(x)|_{x=B}>_N}{2^{Y_j}} >_{2^b}$$

Because the bivariate polynomials in the root key material are symmetric A's shared key and B's shared key are often, though not necessarily always, equal. The particular requirements on the integers $p_1, p_2, \ldots, p_m$, and on the (optional) random numbers $\epsilon$ are such that the keys are often equal and almost always close to each other modulo two to the power the key length. If A and B have obtained the same shared key, then they may use it as a symmetric key which is shared between A and B; for example, it may be used for a variety of cryptographic applications, for example, they may exchange one or more messages encrypted and/or or authenticated using the shared key. Preferably, a key derivation algorithm is applied to the shared key for further protection of the master key, e.g., a hash function may be applied.

If A and B have not obtained the same shared key, then it is almost certain that these keys are close to each other, by removing a number of the least significant bits of the keys, the generated keys can almost always be made the same. A and B may verify if their shared keys are equal by performing a key confirmation, for example, A may send to B a message containing the pair (m, E(m)), wherein m is a message, say a fixed string or a random number, and E(m) is the encryption using A's shared key.

By decrypting E(m) using B's shared key, B may verify if the keys are equal. If so, B may respond to A informing him of the situation.

If the keys are not equal, A and B may engage in a key equalization protocol. For example, they may make use of the fact that the two keys are arithmetically close to each other. For example, network device A and B may iteratively remove a least significant bit and send a key confirmation message until the keys are equal. After obtaining equal keys, A and B may perform a key derivation algorithm to regain keys of a usual key length.

The selected m private moduli, $p_1, p_2, \ldots, p_m$, are preferably pair wise relatively prime. If these numbers are pair wise relatively prime the lack of compatibility between the modulo operations is increased. Obtaining pair wise relatively prime numbers may be obtained by selecting the integers in order, testing for each new integer if all pairs of different numbers are still relatively prime, if not the just selected number is removed from the set. This procedure continues until all m numbers are selected.

The complexity increases even further by requiring that the selected m private moduli, $p_1, p_2, \ldots, p_m$, are distinct prime numbers. In that case each prime number may be required to have the form $p_j = N + \gamma_j 2^b$. Wherein the $\gamma_j$ are integers such that $|\gamma_j| < 2^b$. Experiments have confirmed that these primes are easily available. For example, one may repeatedly select a random $\gamma_j$ and test the resulting $p_j$ until a prime is found. The same applies if a more general expression, as described above, is applied. Indeed it follows from the prime number theorem for arithmetic progressions that as long as a is of about the same order of magnitude as b, in particular for a<b, such primes are abundant. In particular, for any combination of key length in the group 64, 128, 196, 256 and degree in the group 2, 3, we confirmed by experiment that many prime numbers of this form could be generated using the above algorithm within practical time limits. When using prime numbers each polynomial $f_j$ is thus taken in the finite field with $p_j$ elements.

Many variants are possible to choose the various parameters used during the registration and use phase. For example, in a simplified embodiment, the private moduli are smaller than the public modulus and satisfy the relationship $p_j = N - \beta_j \cdot 2^b$. Wherein the $\beta_j$ are positive integers such that $\beta_j < 2^b$. One practical way of selecting numbers that satisfy this requirement is to choose a set of m random positive integers $\beta_j$ such that $\beta_j < 2^b$ and compute the selected private moduli from the relationship $p_j = N - \beta_j \cdot 2^b$.

As noted, the difference between $Y_j - Z_j - \log_2(\zeta_j)$ may be $\alpha_j b$. In a similar way, other constructions can be defined following the same concept. In particular, we can write $p_j = \beta 2^X + \gamma_j 2^{Y_j} + \delta 2^W + \zeta_j 2^{Z_j}$ for the private moduli and $N = \beta 2^X + \delta 2^W$ for the public modulus. A particular instantiation of this construction is $p_j = 2^{2(a+1)b} + \gamma_j 2^{(a+1)b} 2^{ab} + \zeta_j$ and $N = 2^{2(a+1)b} + 2^{ab}$. In this case, the absolute value of terms $\gamma_j$ and $\beta_j$ is smaller than $2^b$ and are in charge of creating a non-linear effect on the MSB and LSB of the coefficients of the local stored key material on a device. Note that since the device identifiers are around b-bits long, $\gamma_j$ ($\beta_j$) affects the MSB (LSB) of the coefficients of the polynomial share evaluated in the ring of integers modulo $p_j$. Afterwards during the generation of the local key material for a device the coefficients of the polynomial shares in different rings are added over the integers so that the origin of the contributions is concealed.

The key may be generated as follows:

$$K_{AB} = <\frac{<KM^A(x)|_{x=B}>_N}{2^{Y_j}}>_{2^b},$$

but if the even more general expression of $p_j$ and N is used that allows introducing a non-linear effect on both MSB and LSB, then the division after the reduction modulo N is by 2 to the power of W, where $2^W$ is the highest integer power of 2 of which N is an integer multiple. Other constructions of N and $p_j$ may require a division by another power of two. Because the bivariate polynomials in the root key material are symmetric A's shared key and B's shared key are often, though not necessarily always, equal.

Key Confirmation.

It may be desirable for one of A and B to send a key confirmation message to the other party. A so-called key confirmation message (KC) enables the recipient of the key confirmation message to verify that he has computed the same key as the sender of the key confirmation message. In particular in a key sharing scheme for which it is known that the key established by both parties may differ, a key confirmation message may be used both as a confirmation that both have established the same key, and if not, to determine an equal shared key. For example, in general a MAC (message authentication code) based on the established key can serve as the confirmation message, e.g. an HMAC based on SHA2 or SHA3, or a CMAC based on AES, and the like. Also a cryptographically strong hash function may be used, e.g., a hash of the established key may be used as the key confirmation message. The hash may be computed over the key itself. The MAC can be computed over data which is known by B or included in the key confirmation message, e.g. a nonce, etc.

However, general cryptographically strong key confirmation messages require some resources, possibly more resources than a key sharing algorithm according to the above principles. The key sharing schemes given above allow for simpler functions that require much less computation resources than general purpose key confirmation schemes.

Devices A and B compute keys $K_A(B)$ and $K_B(A)$. It can be shown, by following the mathematical relations, that there exists an integer $\Delta$, depending on the design parameters, such that:

$$K_A(B) \in \{<K_B(A)+j>_{2^b} | -\Delta \leq j \leq \Delta\},$$

Again $<x>_m$ denotes the integer between 0 and m-1 such that $x - <x>_m$ is a multiple of m. Define a function as follows: $h(x) = <x>_{2^r}$ where r is a pre-determined integer such that $2^r \geq 2\Delta+1$. Compared to the general embodiment, there is no need that the devices compute possibly complicated hash functions; the disadvantage is that some information on the key that is being used is sent over an observable communication channel. It is usually preferred that a key confirmation message leaks no, or a negligible amount, of information on the key for which it is computed. This disadvantage can be countered by dividing the established key by $2^r$, after a key has been found that is the same for both A and B. More generally in a second embodiment, $h(x) = <x>_v$ where $v \geq 2\Delta+1$ is such that either $2^b$ is a multiple of v or $<2^b>_v \geq 2\Delta+1$. In both cases, $h(K_A(B))$ may be used by A as a key confirmation message.

Apart from sending a key confirmation message, one may decrease the difference between $K_A(B)$ and $K_B(A)$ by dividing both keys by a power of 2. $K_A(B)$ and $K_B(A)$ are b-bit keys, then removing the l least significant bits of the b-bit generated keys so that a b-l bit-key, which corresponds to the b-l most significant bits of the key generated, is used to secure the communication. If b is relatively big (let's say, 100) and l is also big (let's say, 50), the probability of the b-l most significant bits to be equal is very high, i.e. about $$1 - \frac{2\Delta}{2^{b-l}}.$$

This approach does not require the exchange of any information, l bits of the original generated key are removed, and the resulting key can be used for the communication. However, this has a drawback because the key size is reduced, potentially in a considerable manner to make sure that all the devices in a network will share a common b-l bit key with very high probability.

Note that removing least significant bits may be combined with a key confirmation message. For example, after removing l bits, a key confirmation message is computed and sent to the other party. This approach has the advantage that, even if the removal of least significant bits was not sufficient to establish a common key, it will make it easier to find such a common key.

In a different approach the problem of potentially different keys being established by parties A and B is the following: The central authority has all the information to compute beforehand if any two devices may derive different keys. For example, the central authority may start with single identifier A and keying material computed for A. Devices are added to a pool of device iteratively. When a new device B' is to be added to the system, the TTP computes keying material for B'. The TTP, verifies for each combination of B' and the devices already in the pool if they would arrive at the same common key. For example, the TTP may verify that they find the same key directly. The TTP may also verify that B' and any other device will arrive at a common key be engaging in a suitable key agreement protocol to repair a possible different key; e.g., by dividing by a power of 2 and/or by sending one or more key confirmation messages. In view of the foregoing probabilistic approach, it is very likely that a random choice for B' makes {A,B'} valid for all A if the number of devices A is relatively small.

If it turns out that B' will not arrive at a common key with some of the devices already in the pool, the TTP assigns a new identifier to B' or computes new keying material, but with different random choices. Although checking this condition represents quite an overhead, this is possible for relatively small networks (let's say $\sim O(10^4)$ or $O(10^5)$ devices).

A related approach can also be applied in groups of devices. In particular, in some settings not all devices might require to talk to each other, e.g., if devices are static and are deployed in groups (e.g., in a building). In this case, the verification performed by the TTP when a new device B' is added is limited to checking for the devices belonging to the group to which B' will be added. For instance, the TTP can verify whether all devices in a given group generate a key if the l LSB of the key are removed. Note that this method also allows for the design of more advanced hierarchical schemes such that all devices belong to the main group at a first level, devices are divided into a number of groups at a second level, devices in a group at a second level are further divided into a number of subgroups. In such a hierarchical organization, the TTP might verify whether all devices in a given group at level w generate a common key after the removal of $l_w$ bits. In such a system, groups at a deeper level might require the removal of a lesser number of bits, while groups at high levels might require the removal of more bits to ensure the generation of common keys.

The TTP may perform these checks whenever a new device is added, but it may also pro-actively create a pool of device identifiers and keying material such that each pair of identifiers from this pool gives a valid common key.

For example, the TTP may limit to pairs of valid devices {A,B}, where a pair is valid if:

$$\left\lfloor \frac{K_B(A)}{2^l} \right\rfloor = \left\lfloor \frac{K_A(B)}{2^l} \right\rfloor$$

where l refers to l bits corresponding to the l Least Significant Bits of $K_A(B)$ and $K_B(A)$. This condition, in general, shows a way of verifying that the keys that actually will be used are equal. Another condition is that a new B is admitted if and only if for all A, the l least significant bits of $K_A(B)$ and $K_B(A)$ correspond to a number in $[\Delta, 2^l-1-\Delta]$.

FIG. 1 is a schematic block diagram illustrating a root key material generator 100. A key material obtainer is configured to provide input data, except an identity number, needed by a local key material generator for generating local key material. A key generator is an example of a key material obtainer. Instead of generating all or part of the input data, some parameters can also be obtained by the root key material generator by receiving them; for example the key obtainer may comprise an electronic receiver for receiving input data, e.g., a public and private modulus. A key material obtainer obtains all the needed parameters except the identity numbers from an external source. In an embodiment a,b, m are predetermined, e.g., received and the public modulus and the private moduli and corresponding symmetric bivariate polynomials are generated. In an embodiment also the public modulus is pre-determined, e.g., received.

Root key generator 100 comprises a polynomial degree element 112, a key length element 114 and a number of polynomials element 116 configured to provide the polynomial degree, the key length and the number of polynomials, i.e., a,b and m respectively. Although these elements may be generated, e.g., depending on circumstances, typically these parameters are chosen by a system designer. For example, the elements may be designed as non-volatile memories, or as receivers for receiving the element values, or as volatile memories connected to a receiver, etc. A suitable choice includes a=2, b=128, m=2. Any one of the numbers may be increased or decreased to obtain a more or less secure system.

Root key generator 100 comprises a public modulus element 110 configured to provide the public modulus N. The public modulus may or may not be chosen by a system designer. For example, the public modulus may be set a convenient number allowing fast reduction (close or equal to a power two). The public modulus is chosen within a range determined by the elements 112 and 114.

Root key generator 100 comprises a private modulus manager 122 configured to provide the private modulus p, or multiple private moduli $p_1, \ldots, p_m$. For example, they are chosen at random within the appropriate bounds.

Root key generator 100 comprises a symmetric bivariate polynomial manager 124 configured to provide the symmetric bivariate polynomial f, or multiple symmetric bivariate polynomial, $f_1, \ldots, f_m$. Each symmetric bivariate polynomial is chosen with coefficients random modulo the corresponding private modulus, i.e. the private modulus having the same index. The coefficients may be chosen within the range 0 to p−1, and may be chosen at random.

The private moduli may be chosen by adding or subtracting a multiple of two to the power of the key length to the public modulus. This will result in private moduli such that the difference with the public modulus ends in a series of consecutive zeros. One may also choose a public modulus and one or more private moduli such that a series of key length consecutive zeros occurs not at the end but another position, say position 's', counting from the least significant bit.

Figure 2:
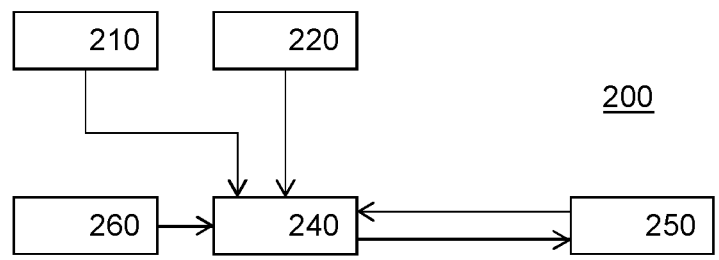
FIG. 2 is a schematic block diagram illustrating a local key material generator.

FIG. 2 is a schematic block diagram illustrating a local key material generator 200. Key material generator 100 and local key material generator 200 together form a system for configuring a network device for key sharing.

Local key material generator 200 comprises a polynomial manipulation device 240. Local key material generator 200 comprises a public material element 210 for providing the public parameters a,N to the polynomial manipulation device 240. Local key material generator 200 comprises a private material element 220 for providing the private parameters $p_i, f_i$ and m to the polynomial manipulation device 240. Elements 210 and 220 may be implemented by the corresponding elements of key material generator 100; these elements may also be memories or busses to connect to key material generator 100.

Local key material generator 200 comprises an obfuscating number generator 260 for providing an obfuscating number '$\epsilon_{A,i}$' to the polynomial manipulation device 240. The obfuscated number may be a random number, e.g.

generated with the random number generator. The obfuscating number generator 260 may generate multiple obfuscating numbers for multiple coefficients of the univariate polynomial. In an embodiment an obfuscating number is determined for each coefficient of the univariate polynomial.

Local key material generator 200 comprises a network device manager 250 configured to receive an identity number for which local key material must be generated, e.g., from a network device, and is configured to send the local key material to the network device corresponding to the identity number. Instead of receiving an identity number, it may also be generated, e.g., as a random, serial or nonce number. In the latter case the identity number is sent along with the local key material to the network device.

The polynomial manipulation device 240 obtains, possibly multiple, univariate polynomials by substituting the identity number from manager 250 into each one of the bivariate polynomials and reducing each modulo the corresponding private modulus. The resulting multiple reduced univariate polynomials are added, coefficient wise, with natural arithmetic addition. Also added are the one or more obfuscating numbers. Preferably, the result is reduced, again coefficient wise, modulo the public modulus; the coefficients of the latter may be represented in the range 0 to N−1.

The obfuscated univariate polynomial is part of the local key material corresponding to the identity number. If needed, the public modulus, degree and the key length are also sent to the network device.

Figure 3:
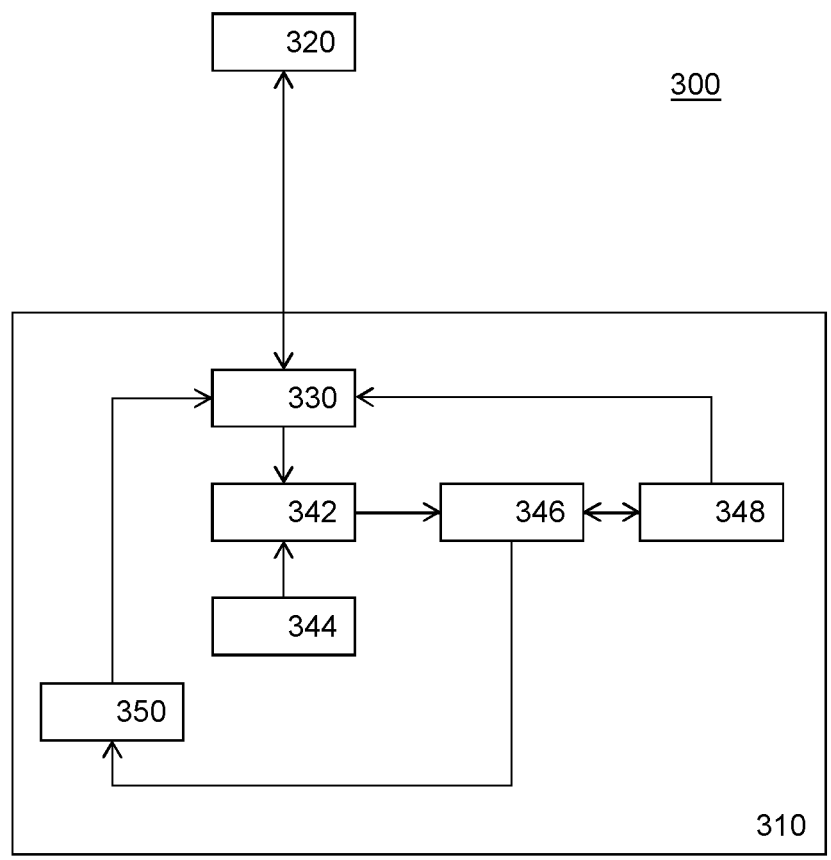
FIG. 3 is a schematic block diagram illustrating a communication network.

FIG. 3 is a schematic block diagram illustrating a communication network 300 comprising multiple network devices; shown are a first network device 310 and a second network device 320. We will illustrate first network device 310. Second network device 320 may be the same, or work along same principles.

Network device 310 comprises a transceiver 330 combining a sender and a receiver for sending and receiving messages in electronic, e.g., digital, format, in wired or wireless from and to second network device 320. Possibly, transceiver 330 is also used to receive the local key material from the network authority 200. Through the transceiver 330 the identity number of another network device is received; in the figure of the second network device 320.

Network device 310 comprises a local key material obtainer 344. The local key material obtainer 344 may be implemented as local memory, e.g., non-volatile memory such as flash memory for storing the local key material. The local key material obtainer 344 may also be configured to obtain the local key material from generator 200, e.g., via transceiver 330. Local key material obtainer 344 is configured to provide the polynomial manipulation device with the needed parameters.

Network device 310 comprises a polynomial manipulation device 342 configured to substituting the identity number of the second network device into the obfuscated univariate polynomial, and to perform two reductions on the result: First reducing the result of the substituting modulo the public modulus and second reducing modulo a key modulus. Note that even if multiple private moduli were used, only one public modulus would be needed. Note that for some combinations of N and private modulus, a division by a 2 power is required before the result is reduced module a key modulus.

Network device 310 comprises a key derivation device 346 for deriving the shared key from the result of the reduction modulo the key modulus. For example, key derivation device 346 may remove one or more least significant bits. Key derivation device 346 may also apply a key derivation function. It is also possible to use the result of the second reduction without further processing.

Network device 310 comprises an optional key equalizer 348. Note that it may happen that the shared key derived in the first network device is not equal to the key derived in the second network device (based on the identity number of the first network device). If this is considered undesirable, a key equalization protocol may be followed.

Network device 310 comprises a cryptographic element 350 configured to use the shared key for a cryptographic application. For example, cryptographic element 350 may encrypt or authenticate a message of the first network device with the shared key before sending it to the second network device, say a status message. For example, cryptographic element 350 may decrypt or verify the authenticity of a message received from the second network device.

Typically, a system for configuring a network device for key sharing 200, and a first network device configured to determine a shared key 310, each comprise a microprocessor (not shown) which executes appropriate software stored at the respective devices, e.g., which software may have been downloaded and stored in a corresponding memory, e.g. RAM (not shown).

An interesting embodiment is obtained for a=1, especially in combination with higher values of m, say higher than 1, 2 or higher, 4 or higher. The required polynomial manipulation reduces to a single multiplication and reduction, giving an especially simple implementation. However, even for this simple case recovering the original bivariate polynomials is not straightforward, and becomes increasingly complicated with higher values of m. Although no viable attack is known even for a=1, the linear structure may be a starting point for future analysis, so one may want to restrict to a >1, for this reason.

FIG. 4 is a schematic flow chart illustrating a method of generating local key material 400. The method comprises obtaining 410 a public and private modulus, and a symmetric bivariate polynomial, obtaining 420 an identity number of a network device, substituting 430 the identity number into the bivariate polynomial modulo the private modulus, adding 440 an obfuscating number to a coefficient, and storing 450 the obfuscated univariate polynomial at the network device FIG. 5 is a schematic flow chart illustrating a method of generating a shared key 500. The method comprises obtaining 510 external identity number of another network device, sending 520 local identity number to other network device, substituting 530 external identity number into the obfuscated univariate polynomial modulo the public modulus, reducing 540 modulo key modulus, deriving 550 a shared key, sending 560 a key confirmation message to the other network device, determining 570 if the key is confirmed 570, and a cryptographic application 580. If the key is not confirmed in step 570 then the method continues in step 550 with deriving a new key. For example, step 550 may remove one additional least significant bit each time the key is not confirmed.

Steps 550, 560, and 570 together form a key equalization protocol. For example, in step 560 a nonce and encryption of the nonce under the shared key derived in step 550 may be sent to the second device. In step 560 a message is received from the second device. The received message may simply say that the received key confirmation message showed that the keys are not equal. The received message may also contain a key confirmation message. In the latter case, the first network device verifies the key confirmation message and establishes if the keys are equal. If not a new key is derived, for example, by deleting a least significant bit.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 410 and 420, or 510 and 520, may be executed, at least partially, in parallel. Moreover, a given step may not have finished completely before a next step is started.

A method according to the invention may be executed using software, which comprises instructions for causing a processor system to perform method 400 or 500. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

Figure 6:
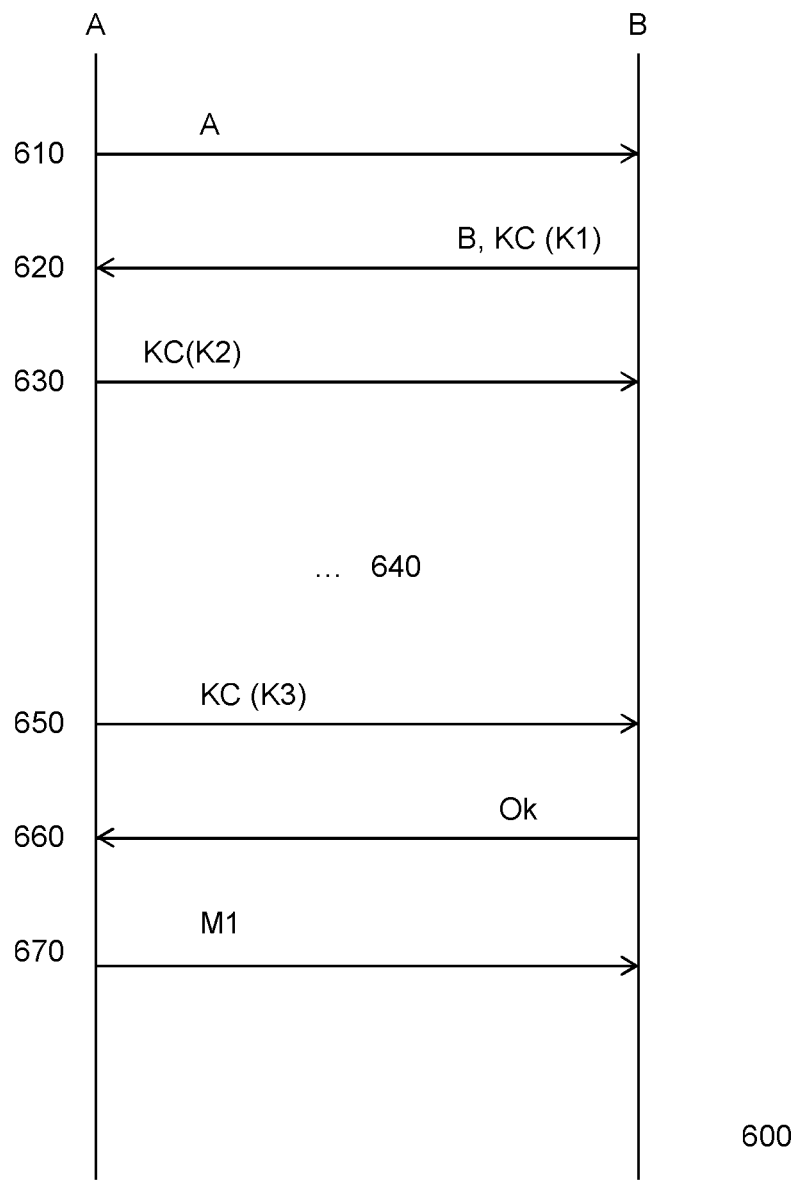
FIG. 6 is a schematic sequence diagram illustrating generating a shared key.

FIG. 6 shows in schematic form a possible sequence of message between two network devices, device A and B, while they are generating a shared key. Time runs downward. In step 610, network device A sends his identity number to device B. In step 620 device B, send his identity number and a key confirmation message for the shared key (K1) it derived based on identity number A and his local key material. In step 630, device A found that they did not generated the same key. Device A has deleted one least significant bit (say integer divide by 2) to obtain key K2. In step 630 device A sends a new key confirmation message. In this fashion A and B exchange key confirmation messages 640 until they arrive at the same key in step 650. In step 650 device A sends a key confirmation message to device B. Device B was able to verify that they had arrived at the same key. In step 660 it sends a confirmation thereof, this may be an authenticated message or a key confirmation message, etc. In step 670 device A sends a message M1 which is encrypted (say using AES) and/or authenticated (say using HMAC) using the now equal shared key.

The algorithm below gives a possible implementation of this approach, i.e., a protocol for mutual key agreement & session key derivation run by Device A and Device B

```
Set I=L
Set continue=TRUE
Set Length = b-I
Generate a b-bit key K
While(continue AND (Length>MINIMUM_LENGTH)){
    K = K>>I
    Perform Mutual authentication handshake with B based
on K
    If handshake successful, then{
        continue=FALSE
    }else{
        Length = b-I
    }
}
```

The protocol removes a number of bits of the bit string generated with a key sharing algorithm, such as described herein, and performs an authentication handshake, e.g., challenge-response. The authentication handshake may comprise a key confirmation message. If it is not successful, a few additional bits are removed, and so on until the handshake is successfully performed or the key got too short. The protocol can be modified in a number of ways, e.g., by removing a variable number of bits depending on the iteration or requiring always a fixed number of steps so that an eavesdropper observing the execution of the protocol does not gain any information about the length of the shared common key between A and B. This approach has the advantage that it makes sure that the shared keys are as long as possible; however, it has the potential disadvantage that it requires a number of exchanges for the agreement on the common key. On the other hand, for most applications this will not be a big problem because for most pairs of devices the keys will be equal or differ only in few bits and only a device pairs will arrive at keys with a relatively high number of different least significant bits. This follows from the properties of the keys generated.

There are other ways to arrive at a same key for both devices. Again we assume that devices A and B compute keys $K_A(B)$ and $K_B(A)$. The protocols below apply for any key sharing scheme for which there exists an integer A, depending on the design parameters, such that:

$$K_A(B) \in \{<K_B(A)+j>_{2^b} | -\Delta \leq j \leq \Delta\}.$$

For example, the key sharing schemes describe herein have this property. The generated keys are represented as b-bits integers. So keys can be considered as elements from the set $\{0, 1, 2, \ldots, 2^b-1\}$. For example, if $\Delta=2$, and $K_B(A)=1$, then $K_A(B)$ is in $\{1, 2, 3, 0, 2^b-1\}$ (note that $<1-2>_{2^b}=2^b-1$). For properly chosen system design parameters, $\Delta$ is relatively small. The invention assures that the same key is generated always because a failure to generate a common key can be recovered from.

According to this method, Device A sends to device B a function value $h(K_A(B))$. Here h is a suitable hash function, e.g. a cryptographic hash function. Device B computes $h(i)$ for all i in $\{<K_B(A)+j>_{2^b} | -\Delta \leq j \leq \Delta\}$ and uses, for future communications, the integer i for which $h(i)$ matches the received value of $h(K_A(B))$. If $\Delta$ is too large, devices A and B may first divide their keys by a power of 2 to reduce the size of $\Delta$.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of configuring a network device for key sharing, the method comprising the steps of:
obtaining in electronic form a private modulus ($p_1$), a public modulus (N), and a bivariate polynomial ($f_1$) having integer coefficients, the binary representation of the public modulus and the binary representation of the private modulus are the same in at least key length (b) consecutive bits;
generating local key material for the network device, the generating step comprising obtaining in electronic form an identity number (A) for the network device, and determining using a polynomial manipulation device a univariate polynomial from the bivariate polynomial by substituting the identity number into the bivariate polynomial, reducing modulo the private modulus the result of the substitution; and
electronically storing the generated local key material at the network device, and storing the public modulus in the network device.

2. The method as claimed in claim 1, wherein the step of generating local key material for the network device comprises:
generating an obfuscating number and adding, using a polynomial manipulation device, the obfuscating number to a coefficient of the univariate polynomial to obtain an obfuscated univariate polynomial, the generated local key material comprising the obfuscated univariate polynomial.

3. The method as claimed in claim 1, wherein the bivariate polynomial ($f_1$) is a symmetric polynomial.

4. The method as claimed claim 1, wherein the least significant key length (b) bits of the binary representation of the public modulus are the same as the least significant key length (b) bits of the private modulus.

5. The method as claimed in claim 1, wherein the method further comprises the steps of:
generating the private modulus ($p_1$) using an electronic random number generator, and/or
generating the bivariate polynomial using an electronic random number generator by generating one or more random coefficients for the bivariate polynomial.

6. The method as claimed in claim 1, wherein the public modulus satisfies $2^{(a+2)b-1} \leq N$, wherein N represents the public modulus, a represents the degree of the bivariate polynomial and b represents the key length.

7. The method as claimed in claim 1, wherein said method further comprises the steps of:
obtaining in electronic form multiple private moduli ($p_i$), and multiple bivariate polynomials ($f_i$) having coefficients modulo $p_i$, such that there is a set of key length (b) consecutive positions in which the binary representation of the public modulus agrees with the binary representation of all private moduli; and
determining the univariate polynomial comprises substituting the identity number into each one of the multiple bivariate polynomials ($f_i$), reducing modulo a private modulus of the multiple private moduli corresponding to the one symmetric bivariate polynomial, and adding the multiple results of the multiple reductions.

8. The method as claimed in claim 1, wherein the obfuscating number is generated such that $$\epsilon_{A,i} | < 2^{(a+1-i)b}$$

wherein $\epsilon_{A,i}$ denotes the obfuscating number, i denotes the degree of the monomial corresponding to the coefficient, a represents the degree of the bivariate polynomial and b represents the key length.

9. A method for a first network device, configured by the method of configuring a network device for key sharing as claimed in claim 1, to determine a shared key, the key being a cryptographic key, the method comprising the steps of:
obtaining local key material for the first network device in electronic form, the local key material comprising a, optionally obfuscated, univariate polynomial;
obtaining an identity number for a second network device, the second network device being different from the first network device;
substituting the identity number of the second network device into the, optionally obfuscated, univariate polynomial;
reducing the result of the substituting modulo the public modulus and reducing modulo a key modulus; and
deriving the shared key from the result of the reduction modulo the key modulus.

10. The method as claimed in claim 9, wherein said method further comprises the step of:
determining if the first network device and the second network device have derived the same shared key, and if not deriving a further shared key from the result of the reduction modulo the key modulus.

11. The method as claimed in claim 9, wherein said method further comprises the step of:
dividing the result of the substituting modulo the public modulus by a zero bit string divisor which is a power of two, the zero bit string divisor being larger than 1.

12. A system for configuring a network device for key sharing, the system comprising:
a key material obtainer for obtaining in electronic form a private modulus ($p_1$), a public modulus (N), and a symmetric bivariate polynomial ($f_1$) having integer coefficients, the binary representation of the public modulus and the binary representation of the private modulus are the same in at least key length (b) consecutive bits; and
a generator for generating local key material for the network device, said generator comprising:
a network device manager for obtaining in electronic form an identity number (A) for the network device and for electronically storing the generated local key material at the network device, and storing the public modulus in the network device; and
a polynomial manipulation device for determining a univariate polynomial from the bivariate polynomial by substituting the identity number into the bivariate polynomial, reducing modulo the private modulus the result of the substitution.

13. A first network device configured to determine a shared key as claimed in claim 1, the key being a cryptographic key, the first network device comprising:
a local key material obtainer for obtaining local key material for the first network device in electronic form, the local key material comprising a, optionally obfuscated, univariate polynomial;
a receiver for obtaining an identity number for a second network device, the second network device being different from the first network device;

a polynomial manipulation device for substituting the identity number of the second network device into the, optionally obfuscated, univariate polynomial and reducing the result of the substituting modulo the public modulus followed by and reducing modulo a key modulus; and a key derivation device for deriving the shared key from the result of the reduction modulo the key modulus.

14. A non-transitory computer-readable medium encoded with a computer program comprising computer program code means for causing a computer, when running the computer program, to configure a network device for key sharing by performing the steps of:

obtaining in electronic form a private modulus ($p_1$), a public modulus (N), and a bivariate polynomial ($f_1$) having integer coefficients, the binary representation of the public modulus and the binary representation of the private modulus are the same in at least key length (b) consecutive bits;

generating local key material for the network device, the generating step comprising obtaining in electronic form an identity number (A) for the network device, and determining using a polynomial manipulation device a univariate polynomial from the bivariate polynomial by substituting the identity number into the bivariate polynomial, reducing modulo the private modulus the result of the substitution; and electronically storing the generated local key material at the network device, and storing the public modulus in the network device.

* * * * *